(12) United States Patent
Hwang et al.

(10) Patent No.: US 12,456,000 B2
(45) Date of Patent: Oct. 28, 2025

(54) COMPUTING DEVICE AND OPERATING METHOD OF COMPUTING DEVICE FOR MAPPING QUANTUM CIRCUIT

(71) Applicant: ELECTRONICS AND TELECOMMUNICATIONS RESEARCH INSTITUTE, Daejeon (KR)

(72) Inventors: Yongsoo Hwang, Daejeon (KR); Byung-Soo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 763 days.

(21) Appl. No.: 17/750,024

(22) Filed: May 20, 2022

(65) Prior Publication Data

US 2022/0374579 A1 Nov. 24, 2022

(30) Foreign Application Priority Data

May 24, 2021 (KR) .......... 10-2021-0066290
Apr. 21, 2022 (KR) .......... 10-2022-0049360

(51) Int. Cl.
*G06F 30/398* (2020.01)
*G06N 10/40* (2022.01)

(52) U.S. Cl.
CPC .......... *G06F 30/398* (2020.01); *G06N 10/40* (2022.01)

(58) Field of Classification Search
CPC ........ G06N 10/60; G06N 10/70; G06N 10/20; G06N 20/00; G06N 10/80; G06N 3/08; G06N 3/0985; G06N 7/08; G06N 10/40; G06N 10/00; G06F 15/80; G06F 15/76; G06F 3/0659; G06F 3/0679; G06F 11/0736; G06F 17/11; G06F 30/27; G06F 9/48; G06F 30/20; G06F 30/3308; G06F 30/398; G06F 7/5443
USPC .................................................. 716/106–115
See application file for complete search history.

(56) References Cited

U.S. PATENT DOCUMENTS

| | | | |
|---|---|---|---|
| 10,171,088 B1 | 1/2019 | Kim | |
| 10,963,809 B2 | 3/2021 | Gambetta | |
| 2005/0224784 A1* | 10/2005 | Amin | G06N 10/20 |
| | | | 257/14 |
| 2016/0321559 A1* | 11/2016 | Rose | G06N 10/60 |
| 2019/0244128 A1 | 8/2019 | Choi | |

(Continued)

FOREIGN PATENT DOCUMENTS

JP 2020-080173 A 5/2020

OTHER PUBLICATIONS

Swamit S. Tannu et al., "Not All Qubits Are Created Equal—a Case for Variability-Aware Policies for NISQ-Era Quantum Computers", ASPLOS'19, Apr. 13-17, 2019, pp. 987-999.

(Continued)

*Primary Examiner* — Binh C Tat (57) ABSTRACT

Disclosed is an operating method of a computing device including obtaining information of a quantum chip including qubit nodes, calculating first costs between qubit nodes of the quantum chip, which are adjacent to each other, based on the information of the quantum chip, and calculating second costs between the qubit nodes of the quantum chip based on the costs.

16 Claims, 9 Drawing Sheets

(56) References Cited

U.S. PATENT DOCUMENTS

2019/0266508 A1* 8/2019 Bunyk .................. G06N 10/70
2020/0286595 A1* 9/2020 Neukart ................ G16C 20/90

OTHER PUBLICATIONS

Prakash Murali et al., "Noise-Adaptive Compiler Mappings for Noisy Intermediate-Scale Quantum Computers", ASPLOS'19, Apr. 13-17, 2019, pp. 1015-1029.

Siyuan Niu et al., "A Hardware-Aware Heuristic for the Qubit Mapping Problem in the NISQ Era," IEEE Transactions on Quantum Engineering, 2020.

* cited by examiner

```
Start
  ↓
Obtain quantum chip information — S110
  ↓
Calculate first costs between
qubit nodes adjacent to each other — S120
  ↓
Calculate second costs between
qubit nodes — S130
  ↓
End
```

FIG. 4

|          | Error Rate | Time  |
|----------|------------|-------|
| (q1, q2) | 0.012      | 850ns |
| (q1, q3) | 0.023      | 735ns |
| (q2, q4) | 0.009      | 655ns |
| (q2, q5) | 0.015      | 800ns |
| (q3, q5) | 0.031      | 700ns |

|    | Q1    | Q2    | Q3    | Q4    | Q5    |
|----|-------|-------|-------|-------|-------|
| Q1 | -     | 0.988 | 0.977 | 0.950 | 0.956 |
| Q2 | 0.988 | -     | 0.942 | 0.985 | 0.991 |
| Q3 | 0.977 | 0.942 | -     | 0.969 | 0.891 |
| Q4 | 0.950 | 0.985 | 0.969 | -     | 0.947 |
| Q5 | 0.956 | 0.991 | 0.891 | 0.947 | -     |

FIG. 13

COMPUTING DEVICE AND OPERATING METHOD OF COMPUTING DEVICE FOR MAPPING QUANTUM CIRCUIT

CROSS-REFERENCE TO RELATED APPLICATIONS

This application claims priority under 35 U.S.C. § 119 to Korean Patent Application No. 10-2021-0066290 filed on May 24, 2021 and Korean Patent Application No. 10-2022-0049360 filed on Apr. 21, 2022, in the Korean Intellectual Property Office, the disclosures of which are incorporated by reference herein in their entireties.

BACKGROUND

Embodiments of the present disclosure described herein relate to an electronic device, and more particularly, relate to a computing device for mapping a quantum circuit and an operating method of the computing device.

Physical characteristics of quantum computers are different from those of general computers. Accordingly, a quantum algorithm logically organized to be operated in a quantum computer needs be converted into a quantum circuit based on physical characteristics of the quantum computer. A procedure of converting the quantum algorithm into the quantum circuit is called "quantum circuit mapping".

According to characteristics of the quantum computer, physical characteristics of quantum computers may be different from one another. For example, quantum computers implemented based on semiconductors (superconductors, quantum dots, and the like) have strong spatial locality constraints. A semiconductor-based quantum computer may execute a 2-qubit quantum gate (e.g., a Controlled-NOT (CNOT) gate, a Controlled-Z (CZ) gate, or the like) between only qubit nodes that are physically and spatially adjacent to one another.

The performances (e.g., an error rate or a physical gate running time) between qubit nodes and qubit links of quantum computers thus developed so far are not uniform. Even though quantum circuit mapping is made by using the same quantum algorithm, the performance of the quantum computer may vary depending on the mapping between qubits of the quantum algorithm and qubit nodes of the quantum chip.

SUMMARY

Embodiments of the present disclosure provide a computing device that makes quantum circuit mapping for providing high and uniform performance, and an operating method of the computing device.

According to an embodiment, an operating method of a computing device includes obtaining information of a quantum chip including qubit nodes, calculating first 2-qubit quantum gate execution costs (e.g., CNOT, CZ, or the like) between qubit nodes of the quantum chip, which are adjacent to each other, based on the information of the quantum chip, and calculating second 2-qubit quantum gate execution costs between the qubit nodes of the quantum chip based on the first 2-qubit quantum gate execution costs.

In an embodiment, the 2-qubit quantum gate execution costs include attenuation of fidelity or a movement time.

In an embodiment, the calculating of the second 2-qubit quantum gate execution costs is based on Floyd-Warshall algorithm.

In an embodiment, the second 2-qubit quantum gate execution costs include moving costs when the qubit nodes respectively moves to other qubit nodes.

In an embodiment, the operating method of a computing device further includes mapping qubits of quantum algorithm into the qubit nodes of the quantum chip and mapping candidate quantum circuits based on the second 2-qubit quantum gate execution costs.

In an embodiment, the mapping of the candidate quantum circuits includes generating a first candidate quantum circuit. The generating of the first candidate quantum circuit includes generating a directed acyclic graph (DAG) of quantum gates of the quantum algorithm, selecting a front layer of the DAG, and adding a 1-qubit gate among quantum gates of the front layer to the first candidate quantum circuit.

In an embodiment, the generating of the first candidate quantum circuit further includes removing the 1-qubit gate added to the first candidate quantum circuit from the DAG and adding a next quantum gate, which is dependent on the 1-qubit gate, to the front layer.

In an embodiment, the generating of the first candidate quantum circuit further includes adding the 2-qubit quantum gate to the first candidate quantum circuit when qubit nodes corresponding to inputs of a 2-qubit quantum gate of the front layer are adjacent to each other and have a minimum 2-qubit quantum gate execution cost.

In an embodiment, the generating of the first candidate quantum circuit further includes adding swap candidate gates associated with the qubit nodes corresponding to the inputs of the 2-qubit quantum gate of the front layer when qubit nodes corresponding to inputs of a 2-qubit quantum gate of the front layer are adjacent to each other and do not have a minimum 2-qubit quantum gate execution cost.

In an embodiment, the associated swap candidate gates move a qubit (e.g., quantum state) of a first qubit node to other qubits adjacent to a second qubit node among the first qubit node and the second qubit node, which correspond to the inputs of the 2-qubit quantum gate of the front layer.

In an embodiment, the generating of the first candidate quantum circuit further includes adding the 2-qubit quantum gate of the front layer and a swap gate in which the qubit nodes corresponding to the inputs of the 2-qubit quantum gate of the front layer are adjacent to each other and which has a minimum 2-qubit quantum gate execution cost, from among the associated swap candidate gates to the first candidate quantum circuit.

In an embodiment, the generating of the first candidate quantum circuit further includes adding swap candidate gates associated with the qubit nodes corresponding to the inputs of the 2-qubit quantum gate of the front layer when qubit nodes corresponding to inputs of a 2-qubit quantum gate of the front layer are not adjacent to each other.

In an embodiment, the operating method of a computing device further includes measuring performances of the candidate quantum circuits and determining a candidate quantum circuit, which has the highest performance, from among the candidate quantum circuits as a quantum circuit.

The measuring of the performances of the candidate quantum circuits includes measuring a performance of a first candidate quantum circuit. The measuring of the performance of the first candidate quantum circuit includes measuring attenuations of fidelity between inputs and outputs of the first candidate quantum circuit and selecting the greatest attenuation of the fidelity as a performance of the first candidate quantum circuit.

In an embodiment, the measuring of the performances of the candidate quantum circuits includes measuring a performance of a first candidate quantum circuit. The measuring of the performance of the first candidate quantum circuit includes measuring passages of time between inputs and outputs of the first candidate quantum circuit and selecting the longest passage of the time as a performance of the first candidate quantum circuit.

According to an embodiment, a computing device includes a cost calculation unit that calculates 2-qubit quantum gate execution costs between qubit nodes based on information of a quantum chip including the qubit nodes and a circuit mapping unit that maps a quantum circuit based on the 2-qubit quantum gate execution costs and a quantum algorithm. The 2-qubit quantum gate execution costs include attenuation of fidelity of (of ? or ?) a movement time when the qubit nodes respectively moves to other qubit nodes.

In an embodiment, the circuit mapping unit changes mapping between qubits of the quantum algorithm and the qubit nodes, generates two or more candidate quantum circuits, and determines a candidate quantum circuit, which has the highest performance, from among the two or more candidate quantum circuits as the quantum circuit.

In an embodiment, the circuit mapping unit adds swap gates to the candidate quantum circuits based on the 2-qubit quantum gate execution costs and maps the candidate quantum circuits such that the candidate quantum circuits are capable of being executed in the quantum chip.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the present disclosure.

Figure 1:
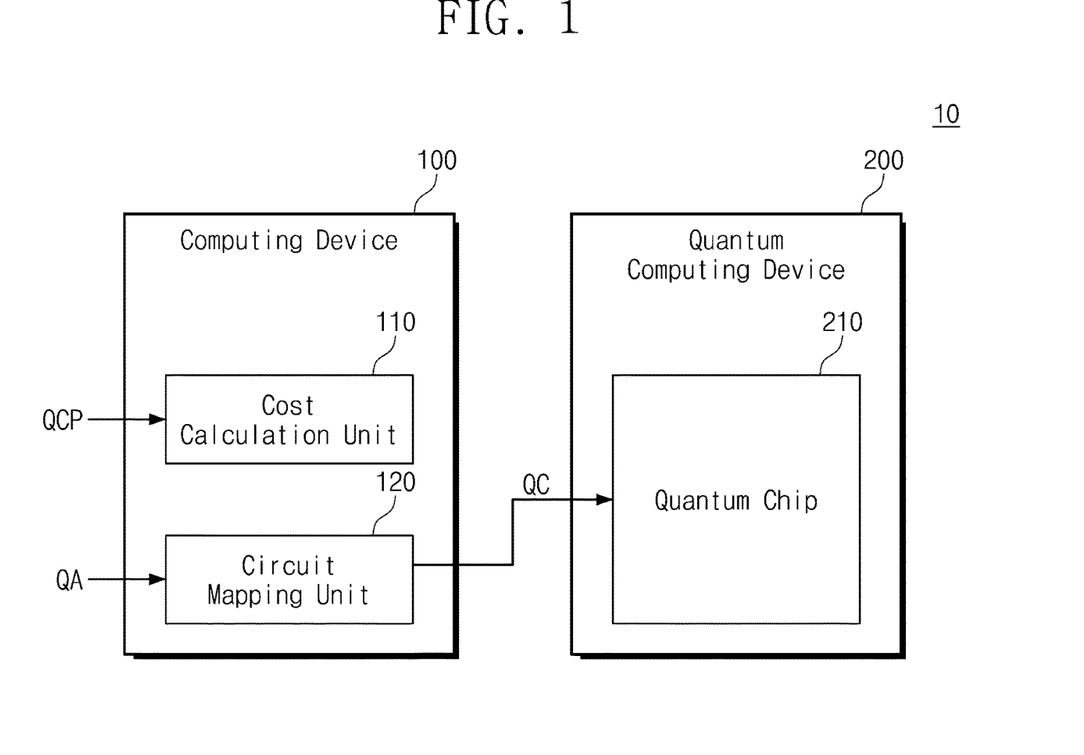
FIG. 1 shows a quantum system, according to an embodiment of the present disclosure.

FIG. 1 shows a quantum system 10, according to an embodiment of the present disclosure. Referring to FIG. 1, the quantum system 10 may include a computing device 100 and a quantum computing device 200.

The computing device 100 may generate a quantum circuit QC based on quantum chip performance information QCP and a quantum algorithm QA. The computing device 100 may include a cost calculation unit 110 and a circuit mapping unit 120.

The cost calculation unit 110 may calculate 2-qubit quantum gate execution costs between qubit nodes of a quantum chip. The 2-qubit quantum gate execution costs between the qubit nodes of the quantum chip may be costs that occur when an operation of the 2-qubit quantum gate (e.g., a Controlled-NOT (CNOT) gate, a Controlled-Z (CZ) gate, or the like) is performed between the qubit nodes. The circuit mapping unit 120 may generate the quantum circuit QC based on the quantum algorithm QA and the costs of the cost calculation unit 110. The circuit mapping unit 120 may add swap gates to the quantum circuit QC based on the quantum algorithm QA and the costs and may measure the performance of the quantum circuit QC.

The quantum computing device 200 may perform quantum computing. The quantum computing device 200 may be implemented based on a semiconductor such as a superconductor, a quantum dot, or the like. The quantum computing device 200 may include a quantum chip 210 including a plurality of qubit nodes.

Figure 2:
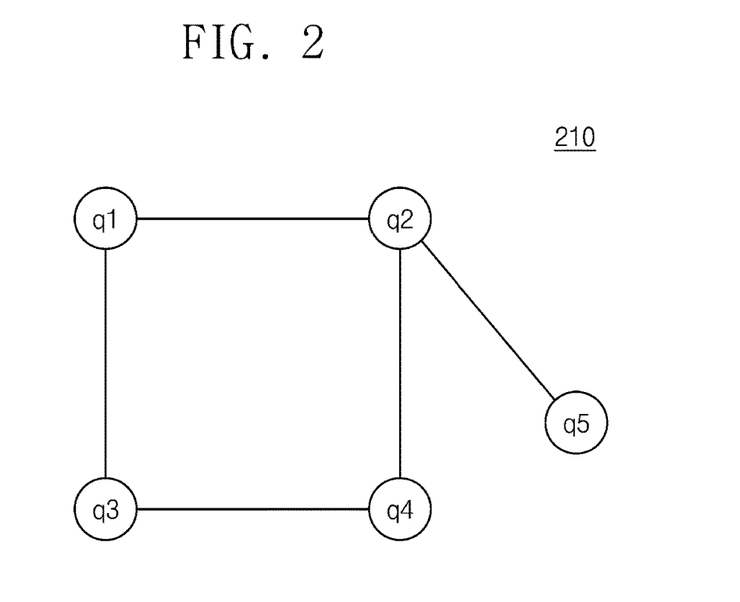
FIG. 2 shows qubit nodes of a quantum chip.

FIG. 2 shows qubit nodes of the quantum chip 210. Referring to FIGS. 1 and 2, the quantum chip 210 may include first to fifth qubit nodes q1 to q5. When the quantum computing device 200 is implemented based on a semiconductor, the quantum computing device 200 may have constraints of spatial locality. For example, a multi-qubit operation gate of the quantum computing device 200 may perform an operation on only qubit nodes that are directly connected by qubit links.

For example, an operation of a multi-qubit gate may be performed on qubits of the first qubit node q1 and the second qubit node q2. However, the operation of the multi-qubit gate may not be performed on qubits of the first qubit node q1 and the fourth qubit node q4. When the operation of the multi-qubit gate is performed on qubits of the first qubit node q1 and the fourth qubit node q4, there is a need to first perform an operation of the swap gate that moves a qubit of the fourth qubit node q4 to the second qubit node q2 or the third qubit node q3.

The addition of swap gate(s) may affect the performance of the quantum computing device 200. The computing device 100 according to the embodiment of the present disclosure may calculate costs at a point in time when the swap gate is included, and may select a location of the swap gate based on the costs. Accordingly, performance degradation (or performance fluctuation) due to the addition of the swap gate may be minimized.

Figure 3:
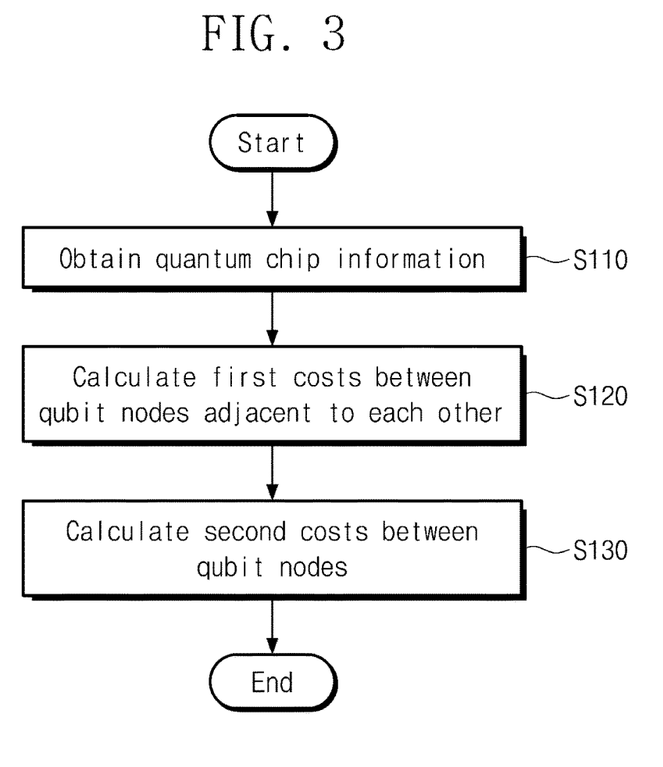
FIG. 3 shows an operating method of a computing device, according to an embodiment of the present disclosure.

FIG. 3 shows an operating method of the computing device 100, according to an embodiment of the present disclosure. Referring to FIGS. 1 and 3, in operation S110, the cost calculation unit 110 of the computing device 100 may obtain quantum chip performance information QCP. The quantum chip performance information QCP may be calculated from physical characteristics of the quantum computing device 200. The quantum chip performance information QCP may include structure information of qubit nodes of the quantum chip 210, and performance information (speed information expressed as an error rate or an operating time) of qubit nodes and qubit links.

Figure 4:
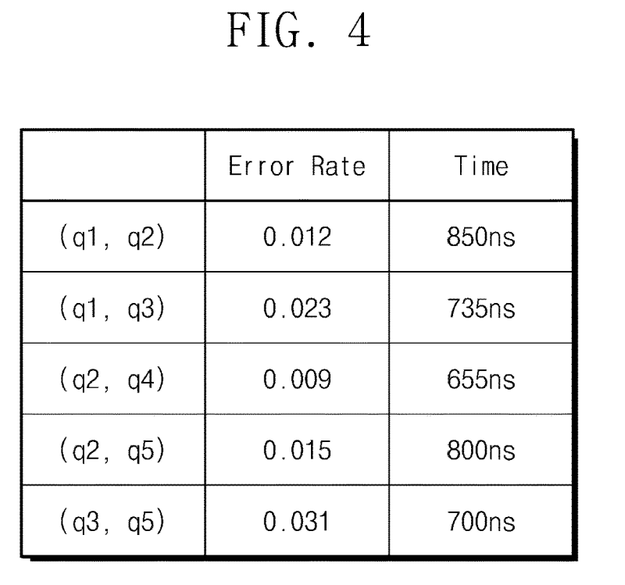
FIG. 4 shows an example of first 2-qubit quantum gate execution costs.

In operation S120, the cost calculation unit 110 of the computing device 100 may calculate first 2-qubit quantum gate execution costs between qubit nodes adjacent to each other. The first 2-qubit quantum gate execution costs may be costs obtained by performing an operation of a quantum gate (e.g., CNOT gate) between adjacent qubit nodes of the quantum chip 210. The first 2-qubit quantum gate execution costs may include an error rate and a calculation time. An example of the first 2-qubit quantum gate execution costs is shown in FIG. 4. Besides, an example in which the first 2-qubit quantum gate execution costs are mapped into the qubit links of the quantum chip 210 is shown in FIG. 5.

Figure 5:
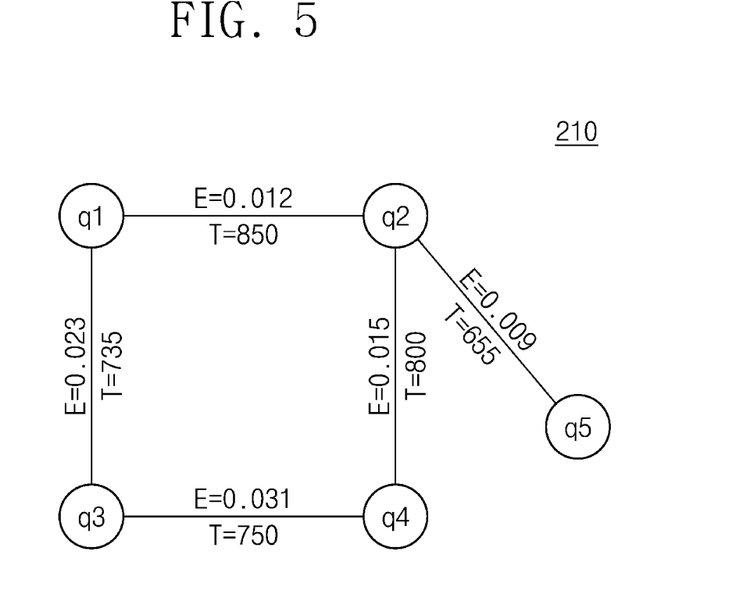
FIG. 5 shows an example in which first movement times are mapped to qubit links of a quantum chip.

Referring to FIGS. 4 and 5, when an operation of the 2-qubit quantum gate is performed between the first and second qubit nodes q1 and q2, an error rate E may be 1.2% (fidelity of 98.8%), and a calculation time T may be 850 ns. When an operation of the 2-qubit quantum gate is performed between the first and third qubit nodes q1 and q3, the error rate E may be 2.3% (fidelity of 97.7%), and the calculation time T may be 735 ns.

When an operation of the 2-qubit quantum gate is performed between the second and fourth qubit nodes q2 and q4, the error rate E may be 1.5% (fidelity of 98.5%), and the calculation time T may be 800 ns. When an operation of the 2-qubit quantum gate is performed between the second and fifth qubit nodes q2 and q5, the error rate E may be 0.9% (fidelity of 99.1%), and the calculation time T may be 655 ns. When an operation of the 2-qubit quantum gate is performed between the third and fifth qubit nodes q3 and q5, the error rate E may be 10.9% (fidelity of 89.1%), and the calculation time T may be 4,560 ns.

Returning to FIGS. 1 and 3, in operation S130, the cost calculation unit 110 of the computing device 100 may calculate second 2-qubit quantum gate execution costs between qubit nodes. For example, the cost calculation unit 110 of the computing device 100 may calculate the second 2-qubit quantum gate execution costs based on the first 2-qubit quantum gate execution costs. The second costs may be costs (e.g., optimal or minimal costs) obtained by performing an operation of a 2-qubit quantum gate on a qubit of each of qubit nodes of the quantum chip 210 with each of qubit (that are adjacent to each other or are not adjacent to each other) of other qubit nodes. The second 2-qubit quantum gate execution costs corresponding to qubits that are not adjacent to each other may include a calculation cost (e.g., a moving cost of a qubit) of a swap gate.

For example, the cost calculation unit 110 of the computing device 100 may calculate the second 2-qubit quantum gate execution costs based on Floyd-Warshall algorithm. The second 2-qubit quantum gate execution costs may include the fidelity or operating time of an operation of the swap gate. For example, an example of the fidelity of the second 2-qubit quantum gate execution costs is shown in FIG. 6.

Figure 6:
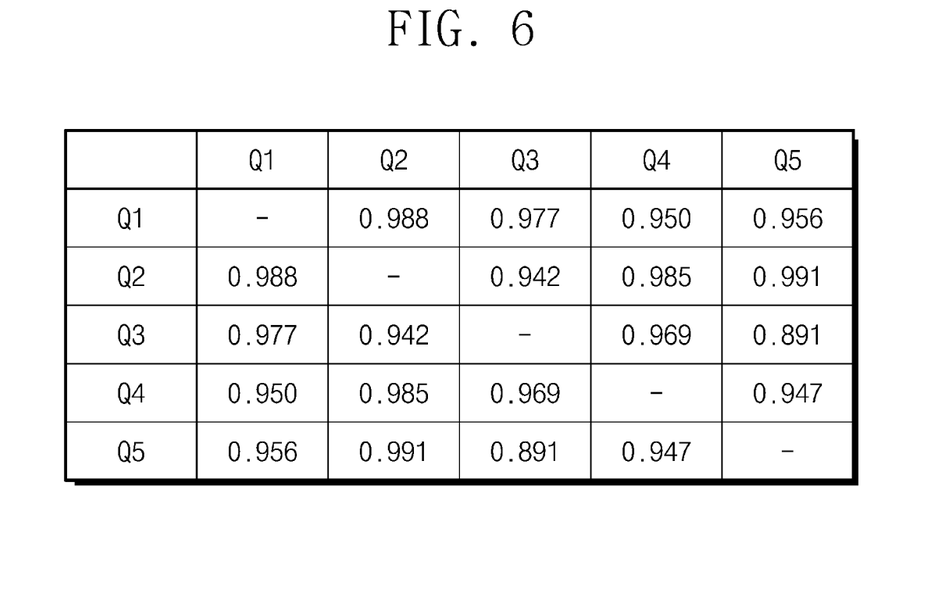
FIG. 6 shows an example of fidelity of second 2-qubit quantum gate execution costs.

Referring to FIG. 6, the fidelity of the 2-qubit quantum gate operation of the qubit of the first qubit node q1 and the qubit of the second qubit node q2 may be 98.8%. The fidelity of the 2-qubit quantum gate operation of the qubit of the first qubit node q1 and the qubit of the third qubit node q3 may be 97.7%. The fidelity of the 2-qubit quantum gate operation of the qubit of the first qubit node q1 and the qubit of the fourth qubit node q4 may be 95.0%. The fidelity of the 2-qubit quantum gate operation of the qubit of the first qubit node q1 and the qubit of the fifth qubit node q5 may be 95.6%.

The fidelity of the 2-qubit quantum gate operation of the qubit of the second qubit node q2 and the qubit of the first qubit node q1 may be 98.8%. The fidelity of the 2-qubit quantum gate operation of the qubit of the second qubit node q2 and the qubit of the third qubit node q3 may be 94.2%. The fidelity of the 2-qubit quantum gate operation of the qubit of the second qubit node q2 and the qubit of the fourth qubit node q4 may be 98.5%. The fidelity of the 2-qubit quantum gate operation of the qubit of the second qubit node q2 and the qubit of the fifth qubit node q5 may be 99.1%.

The fidelity of the 2-qubit quantum gate operation of the qubit of the third qubit node q3 and the qubit of the first qubit node q1 may be 97.7%. The fidelity of the 2-qubit quantum gate operation of the qubit of the third qubit node q3 and the qubit of the second qubit node q2 may be 94.2%. The fidelity of the 2-qubit quantum gate operation of the qubit of the third qubit node q3 and the qubit of the fourth qubit node q4 may be 96.9%. The fidelity of the 2-qubit quantum gate operation of the qubit of the third qubit node q3 and the qubit of the fifth qubit node q5 may be 89.1%.

The fidelity of the 2-qubit quantum gate operation of the qubit of the fourth qubit node q4 and the qubit of the first qubit node q1 may be 95.0%. The fidelity of the 2-qubit quantum gate operation of the qubit of the fourth qubit node q4 and the qubit of the second qubit node q2 may be 98.5%. The fidelity of the 2-qubit quantum gate operation of the qubit of the fourth qubit node q4 and the qubit of the third qubit node q3 may be 96.9%. The fidelity of the 2-qubit quantum gate operation of the qubit of the fourth qubit node q4 and the qubit of the fifth qubit node q5 may be 94.7%.

The fidelity of the 2-qubit quantum gate operation of the qubit of the fifth qubit node q5 and the qubit of the first qubit node q1 may be 95.6%. The fidelity of the 2-qubit quantum gate operation of the qubit of the fifth qubit node q5 and the qubit of the second qubit node q2 may be 99.1%. The fidelity of the 2-qubit quantum gate operation of the qubit of the fifth qubit node q5 and the qubit of the third qubit node q3 may be 89.1%. The fidelity of the 2-qubit quantum gate operation of the qubit of the fifth qubit node q5 and the qubit of the fourth qubit node q4 may be 94.7%.

FIG. 6 illustrates the second 2-qubit quantum gate execution cost of fidelity. However, the second 2-qubit quantum gate execution cost may include a movement time. The cost calculation unit 110 of the computing device 100 may calculate the second 2-qubit quantum gate execution costs including fidelities and movement times.

Returning to FIGS. 1 and 3, when the calculation of the second 2-qubit quantum gate execution costs is completed, the process of the cost calculation unit 110 of the computing device 100 may be terminated.

Figure 7:
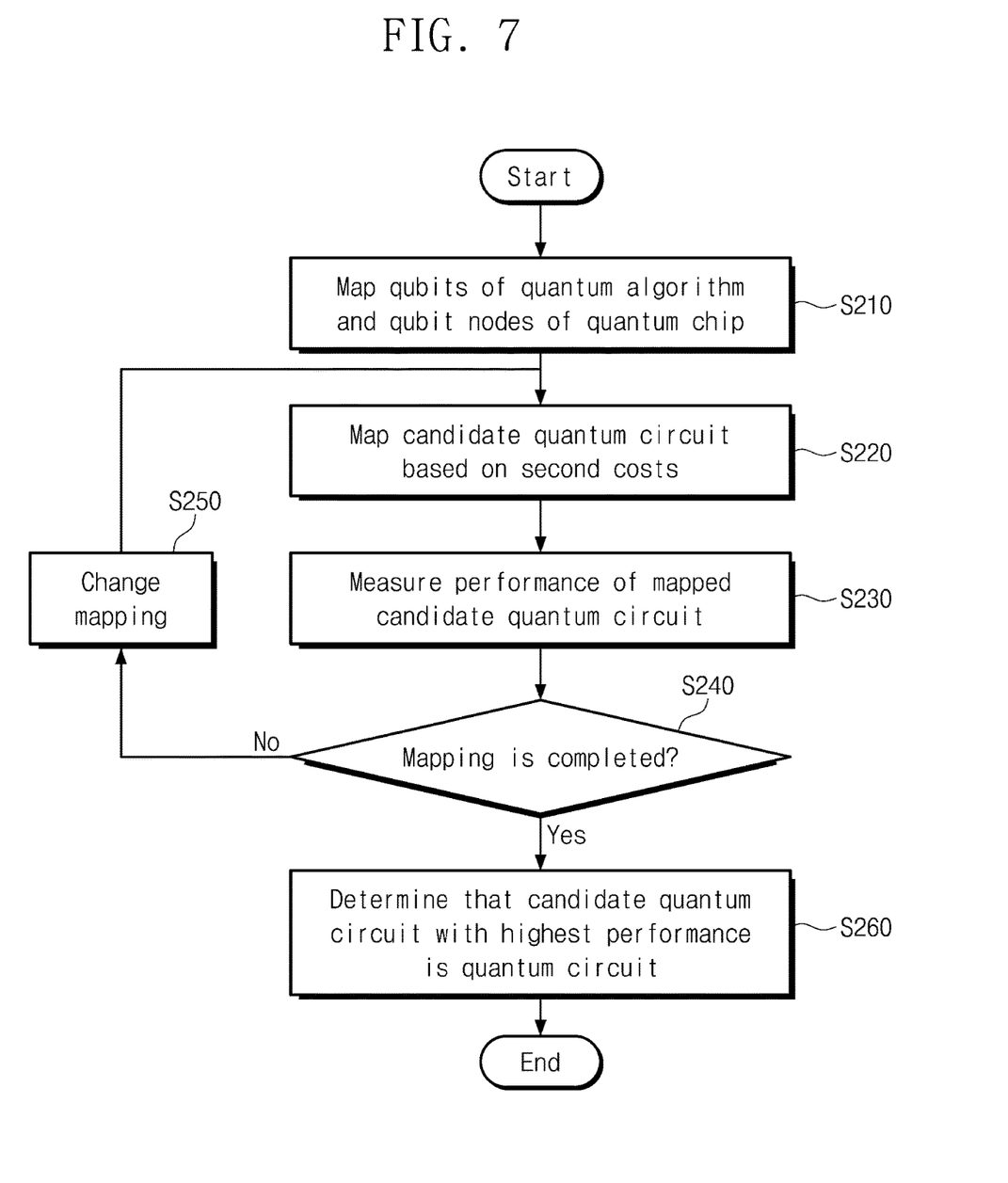
FIG. 7 shows a process in which a circuit mapping unit of a computing device performs mapping of a quantum circuit.

FIG. 7 shows a process in which the circuit mapping unit 120 of the computing device 100 performs mapping of a quantum circuit. Referring to FIGS. 1 and 7, in operation S210, the circuit mapping unit 120 of the computing device 100 may map qubits of a quantum algorithm to qubit nodes of a quantum chip. For example, the circuit mapping unit 120 may map input qubits of the quantum algorithm QA into qubit nodes of the quantum chip 210, respectively.

In operation S220, the circuit mapping unit 120 of the computing device 100 may map a candidate quantum circuit based on the second 2-qubit quantum gate execution costs. For example, the circuit mapping unit 120 may map the candidate quantum circuit by adding the quantum gates and swap gate(s) of the quantum algorithm QA to a list of candidate quantum circuits.

In operation S230, the circuit mapping unit 120 of the computing device 100 may measure the performance of the mapped candidate quantum circuit. For example, the circuit mapping unit 120 may measure the performance of a circuit by performing fidelity propagation. The circuit mapping unit 120 may input qubits having fidelity of '1' as input qubits into the candidate quantum circuit and may calculate fidelities (or attenuation degrees of fidelities) of the output qubits based on the second 2-qubit quantum gate execution costs. The circuit mapping unit 120 may select the lowest fidelity (or the greatest attenuation degree of fidelity) among the fidelities of the output qubits as the performance of the candidate quantum circuit.

As another example, the circuit mapping unit 120 may enter input qubits to the quantum circuit and may calculate times (e.g., operating times) until the output qubits are output, based on the second 2-qubit quantum gate execution costs. The circuit mapping unit 120 may select the longest time among operating times of each qubit as the performance of the candidate quantum circuit.

As another example, the circuit mapping unit 120 of the computing device 100 may measure both fidelity and operating time as the performance of the candidate quantum circuit.

In operation S240, the circuit mapping unit 120 of the computing device 100 may determine whether the mapping is completed. For example, when candidate quantum circuits (?) have been mapped and performances thereof have been measured, the circuit mapping unit 120 may determine that the mapping is completed. As another example, when quantum circuits have been mapped and performances thereof have been measured with respect to all possible mapping cases between input qubits and qubit nodes, the circuit mapping unit 120 may determine that the mapping is completed.

When the mapping is not completed, in operation S250, the circuit mapping unit 120 of the computing device 100 may change the mapping between input qubits and qubit nodes. Afterward, the circuit mapping unit 120 of the computing device 100 may perform operation S220, operation S230, and operation S240 again. That is, the circuit mapping unit 120 of the computing device 100 may change the mapping between input qubits and qubit nodes, may generate a plurality of candidate quantum circuits, and may measure performances of the plurality of candidate quantum circuits.

When the mapping is completed, in operation S260, the circuit mapping unit 120 of the computing device 100 may determine that a candidate quantum circuit with the highest performance is the quantum circuit QC.

For example, the circuit mapping unit 120 may select the candidate quantum circuit with the highest fidelity (or lowest fidelity attenuation level) as the quantum circuit QC. When two or more candidate quantum circuits have fidelities (or the lowest fidelity attenuation levels) that are the lowest and the same as one another, the circuit mapping unit 120 may select a candidate quantum circuit, which has a shorter operating time, from among two or more candidate quantum circuits as the quantum circuit QC.

As another example, the circuit mapping unit 120 may select the candidate quantum circuit with the shortest operating time as the quantum circuit QC. When two or more quantum circuits have operating times that are the shortest and the same as one another, the circuit mapping unit 120 may select a candidate quantum circuit having higher fidelity (or a lower fidelity attenuation level) among two or more candidate quantum circuits as the quantum circuit QC.

As another example, the circuit mapping unit 120 may assign a weight to a fidelity (or an attenuation level of a fidelity) and an operating time in a ratio of "m:n" ('m' and 'n' are positive numbers), and may select the quantum circuit QC among candidate quantum circuits based on the weight.

Figure 8:
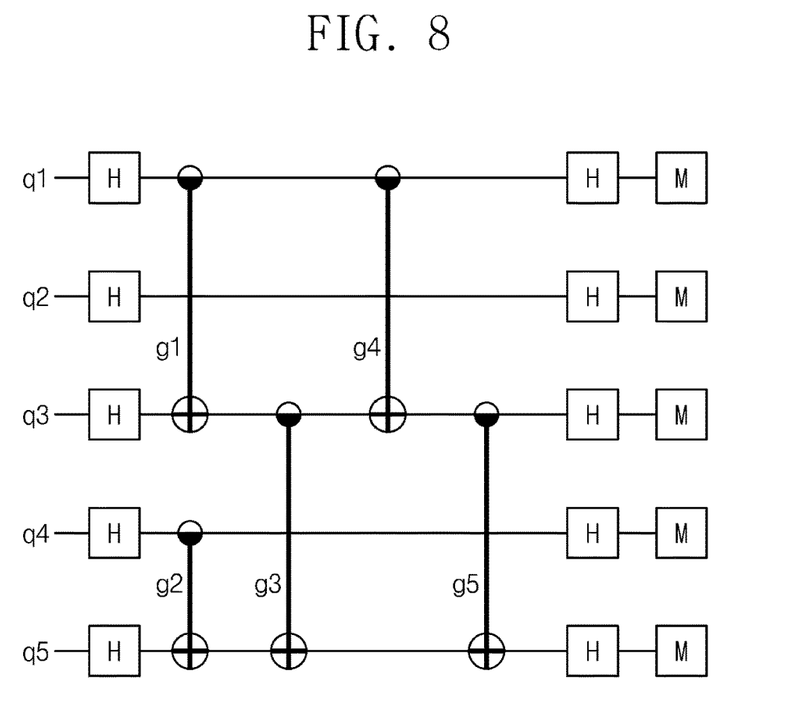
FIG. 8 shows an example of a quantum algorithm.

FIG. 8 shows an example of the quantum algorithm QA. Referring to FIG. 8, first to fifth input qubits may be delivered to measurement nodes (M) through Hadamard gates (H), first to fifth quantum gates g1 to g5, and Hadamard gates (H).

Figure 9:
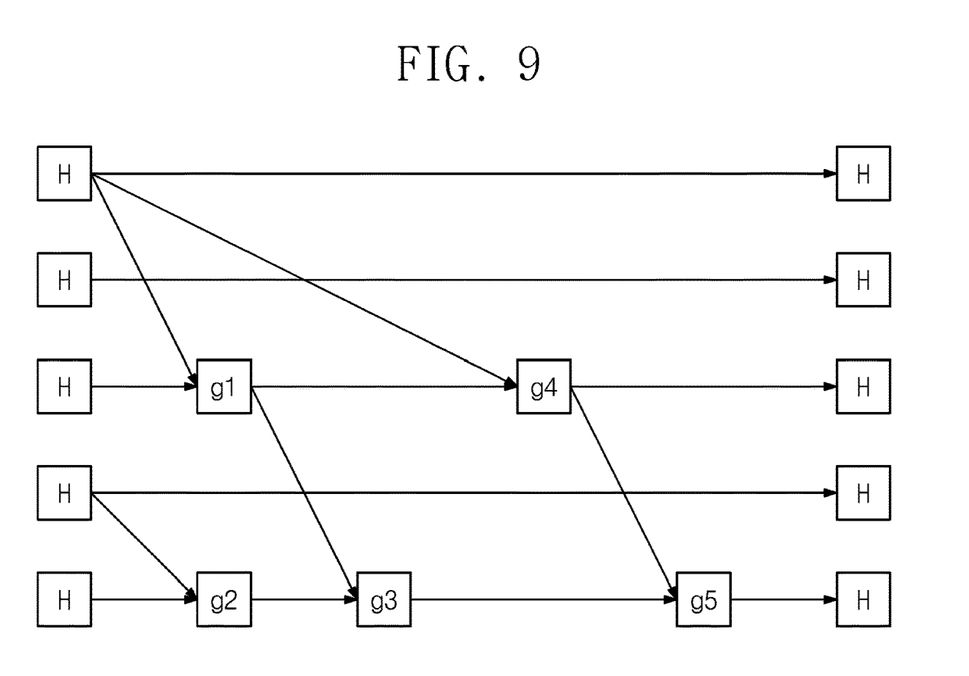
FIG. 9 shows an example in which the quantum algorithm of FIG. 8 is displayed as a directional DAG.

FIG. 9 shows an example in which the quantum algorithm QA of FIG. 8 is displayed as a directed acyclic graph (DAG). The circuit mapping unit 120 according to an embodiment of the present disclosure may map candidate quantum circuits based on DAG of the quantum algorithm QA.

Figure 10:
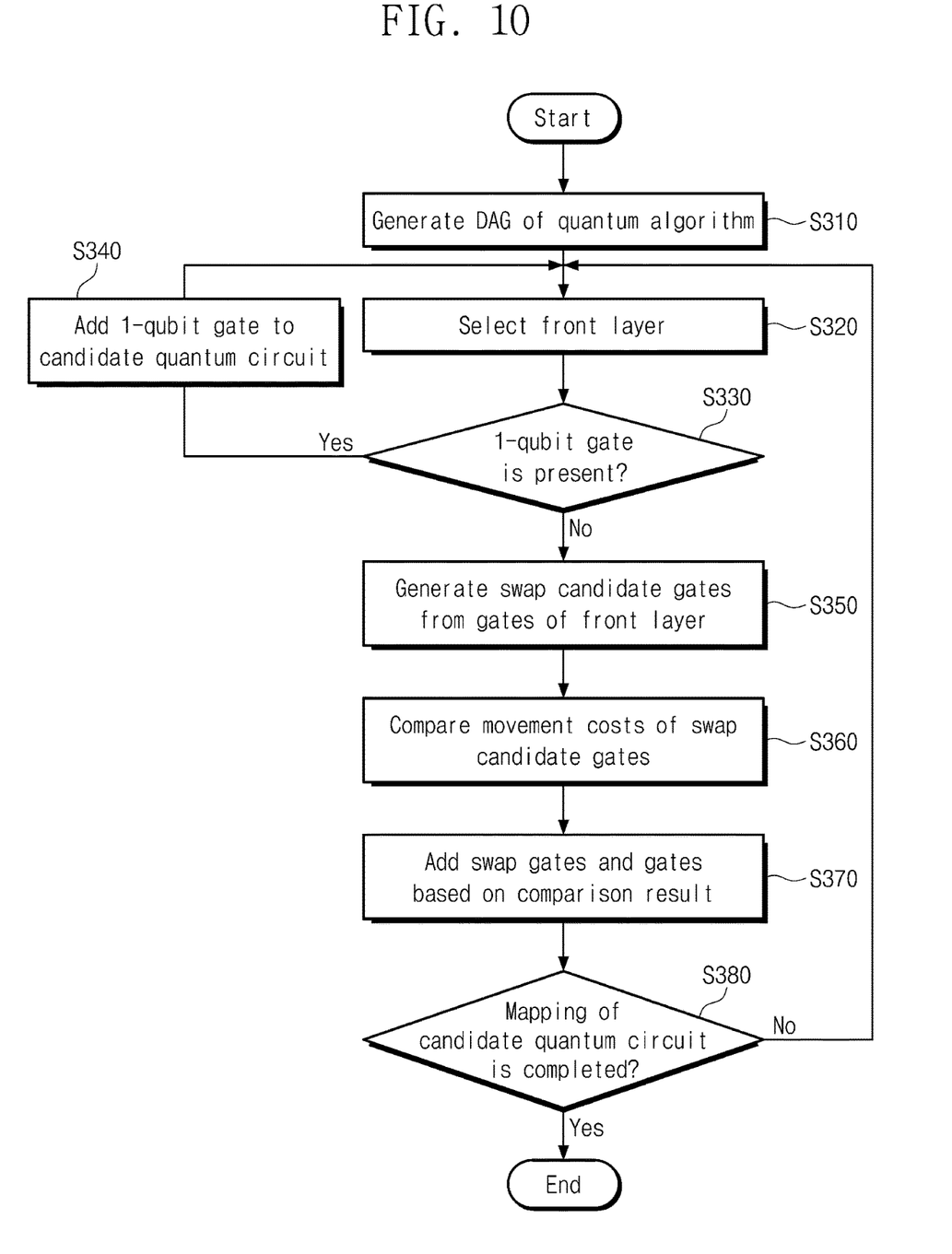
FIG. 10 shows a process in which a circuit mapping unit of a computing device maps a candidate quantum circuit.

FIG. 10 shows a process in which the circuit mapping unit 120 of the computing device 100 maps a candidate quantum circuit. Referring to FIGS. 1 and 10, as shown in FIG. 9, in operation S310, the circuit mapping unit 120 of the computing device 100 may generate the DAG of the quantum algorithm QA.

Figure 11:
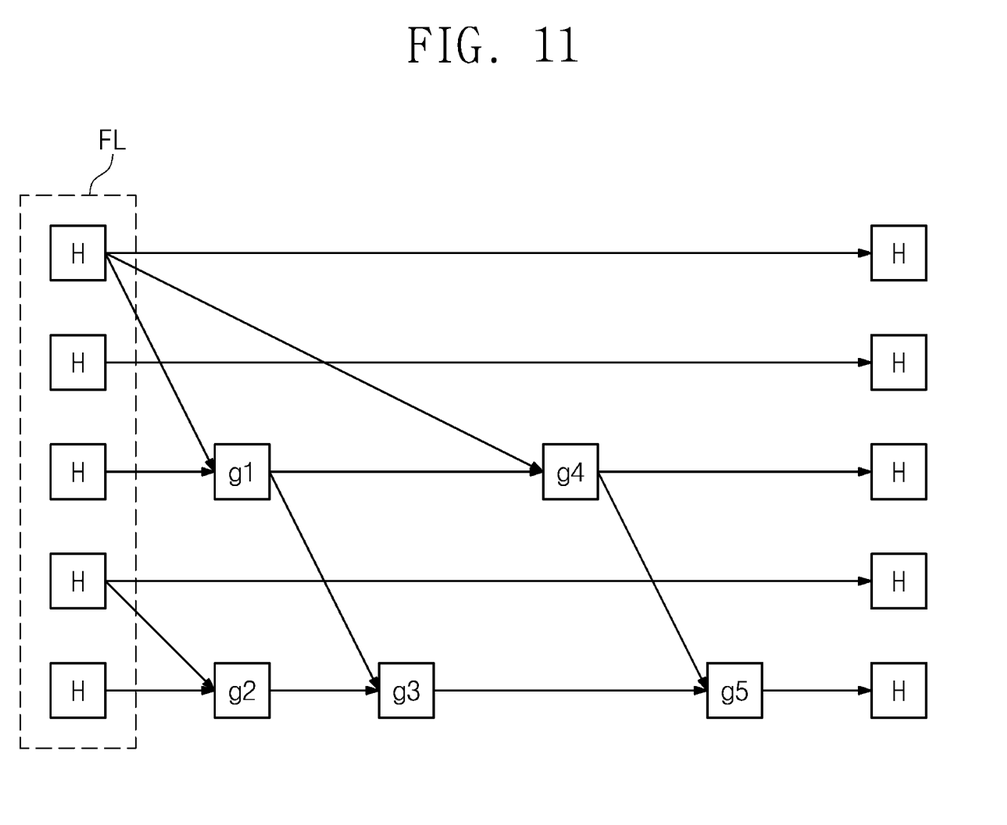
FIG. 11 shows an example of a DAG.

In operation S320, the circuit mapping unit 120 of the computing device 100 may select a front layer of the DAG of the quantum algorithm QA. For example, the front layer may include forefront quantum gates that do not depend on other quantum gates within the DAG. As illustrated in FIG. 11, the initial front layer FL may include Hadamard gates (H).

In operation S330, the circuit mapping unit 120 of the computing device 100 may determine whether a 1-qubit gate is present in the front layer FL. For example, the 1-qubit gate may be a quantum gate that uses one qubit as an input. When the 1-qubit gate is present, in operation S340, the circuit mapping unit 120 of the computing device 100 may add the 1-qubit gate to the candidate quantum circuit.

In the DAG shown in FIG. 11, the Hadamard gates of the front layer FL are 1-qubit gates. Accordingly, the circuit mapping unit 120 may add Hadamard gates, which receive the input qubits q1 to q5, to the candidate quantum circuit. The circuit mapping unit 120 may remove the gates, which are added to the candidate quantum circuit, from the front layer FL and from the DAG. Afterward, in operation S320, the circuit mapping unit 120 may select the front layer again. Accordingly, the DAG of the quantum algorithm QA may be modified as shown in FIG. 12.

Figure 12:
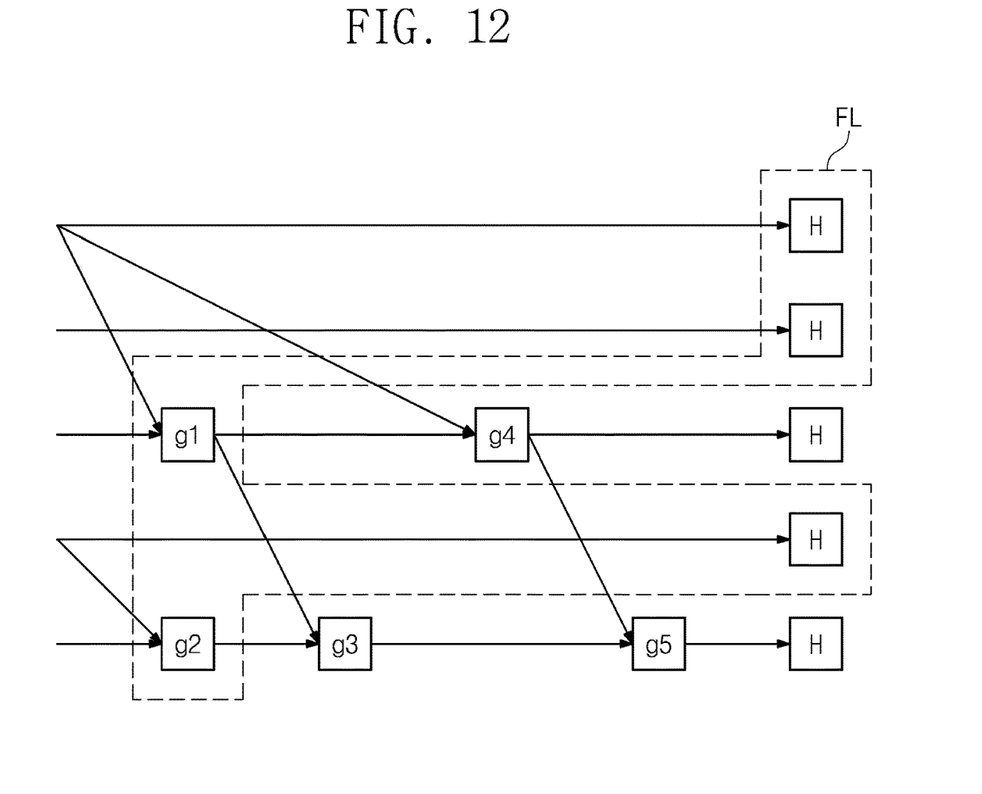
FIG. 12 shows a first example in which DAG is modified.
Figure 13:
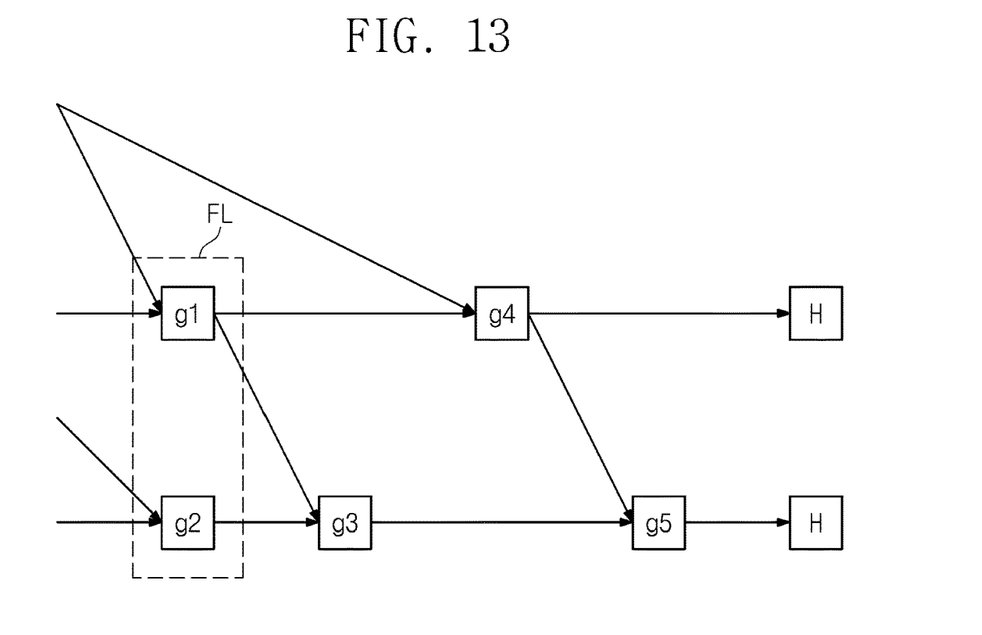
FIG. 13 shows a second example in which DAG is modified.

When operation S330, operation S340, and operation S320 are performed again in the DAG of FIG. 12, the DAG of the quantum algorithm QA may be modified as shown in FIG. 13. The 1-qubit gate is not present in the front layer FL of the DAG of FIG. 13, and thus the circuit mapping unit 120 may proceed from operation S330 to operation S350.

In operation S350, the circuit mapping unit 120 of the computing device 100 may generate swap candidate gates from gates of the front layer FL. The first quantum gate g1 and the second quantum gate g2 are included in the front layer FL, and thus the circuit mapping unit 120 may generate swap candidate gates from the first quantum gate g1 and the second quantum gate g2.

In operation S360, the circuit mapping unit 120 of the computing device 100 may compare the costs of swap candidate gates. In operation S370, the circuit mapping unit 120 of the computing device 100 may add swap gates and quantum gates to the candidate quantum circuit based on the comparison result. For example, the circuit mapping unit 120 may add, to the candidate quantum circuit, a swap candidate gate, which has the lowest cost (e.g., the cost is the same as an optimal or minimum cost in FIG. 6), from among swap candidate gates associated with the first quantum gate g1 together with the first quantum gate g1. Furthermore, the circuit mapping unit 120 may add, to the candidate quantum circuit, a swap candidate gate, which has the lowest cost, from among swap candidate gates associated with the second quantum gate g2 together with the second quantum gate g2.

In some cases, the circuit mapping unit 120 may add the first quantum gate g1 or the second quantum gate g2 alone to the candidate quantum circuit without a swap gate.

In operation S380, the circuit mapping unit 120 of the computing device 100 may determine whether the mapping of the candidate quantum circuit is completed. When a quantum gate is present in the DAG of the quantum algorithm QA (i.e., when all quantum gates are not added to the candidate quantum circuit), the circuit mapping unit 120 may determine that the mapping of the candidate quantum circuit is not completed. When the mapping of the candidate quantum circuit is not completed, the circuit mapping unit 120 may select the front layer again in operation S320.

For example, when the first quantum gate g1 and the second quantum gate g2 are added to the candidate quantum circuit in the DAG of FIG. 13, the first quantum gate g1 and the second quantum gate g2 may be removed from the DAG. Accordingly, the third quantum gate g3 and the fourth quantum gate g4 may be newly included in the front layer FL. Afterward, the circuit mapping unit 120 may perform operation S330 to operation S370 again.

When a quantum gate is not present in the DAG of the quantum algorithm QA (i.e., when all quantum gates are added to the candidate quantum circuit), the circuit mapping unit 120 may determine that the mapping of the candidate quantum circuit is completed. When the mapping of the candidate quantum circuit is completed, the circuit mapping unit 120 may terminate the mapping of the candidate quantum circuit.

Figure 14:
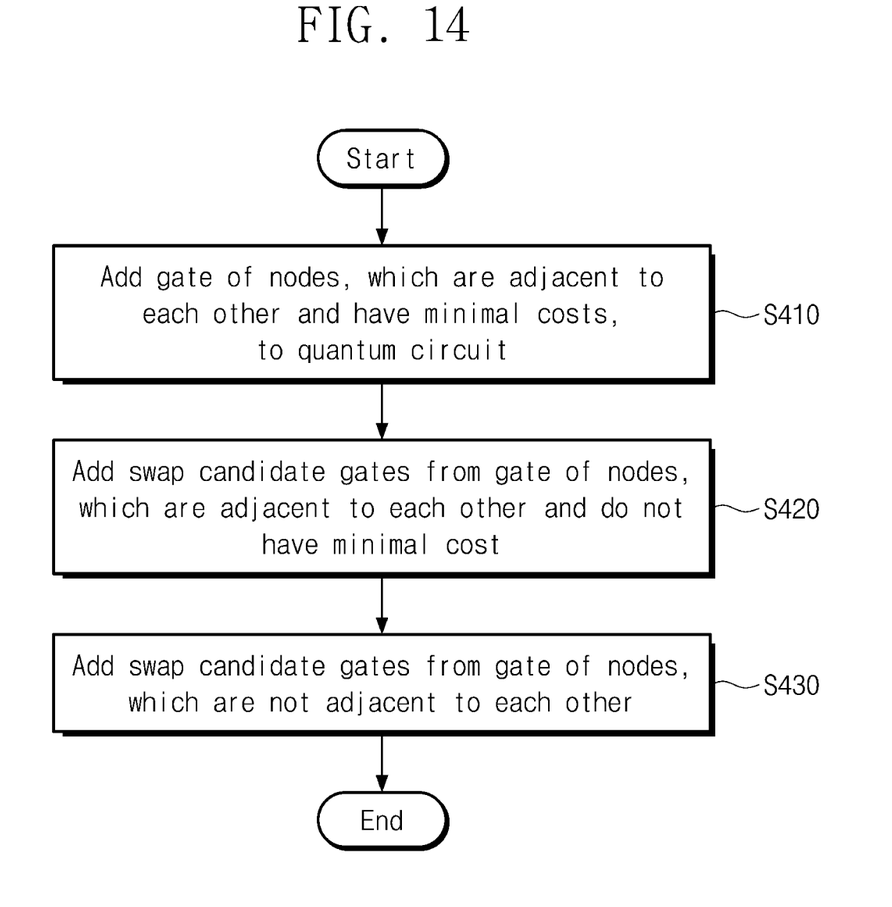
FIG. 14 shows a process in which a computing device adds a 2-qubit quantum gate or at least one swap gate and a 2-qubit quantum gate.

FIG. 14 shows a process in which the computing device 100 adds swap candidate gates. Referring to FIGS. 1 and 14, in operation S410, the circuit mapping unit 120 of the computing device 100 may add a 2-qubit quantum gate having qubit nodes, which are physically adjacent to each other (e.g., connected by qubit links) as input nodes and have the minimal execution costs (e.g., such as optimal or minimum costs in FIG. 6) between each other, to the candidate quantum circuit without a swap gate.

For example, referring to FIG. 5, the second qubit node q2 and the fifth qubit node q5 are connected by a qubit link. The calculation cost of the 2-qubit quantum gate is the lowest in the second qubit node q2 and the fifth qubit node q5. Accordingly, a 2-qubit quantum gate having the second qubit node q2 and the fifth qubit node q5 as input nodes may be added to the candidate quantum circuit without a swap gate.

In operation S420, the circuit mapping unit 120 of the computing device 100 may add swap candidate gates associated with input nodes of a 2-qubit quantum gate having qubit nodes, which are physically adjacent to each other (e.g., connected by qubit links) as input nodes and do not have the minimal 2-qubit quantum gate execution cost.

The circuit mapping unit 120 may add a swap gate and a quantum gate, which correspond to the optimal or minimum cost of FIG. 6, from among the swap candidate gates to the candidate quantum circuit.

In operation S430, the circuit mapping unit 120 of the computing device 100 may add the swap candidate gates associated with input nodes of a 2-qubit quantum gate having qubit nodes, which are not physically adjacent to each other (e.g., not connected by qubit links), as input nodes.

The circuit mapping unit 120 may add a swap gate and a quantum gate, which correspond to the optimal or minimum cost of FIG. 6, from among the swap candidate gates to the candidate quantum circuit.

As described above, the computing device according to an embodiment of the present disclosure may uniformly map the quantum circuit QC at a minimum cost.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, swap gates are added to overcome physical-spatial locality constraints based on a 2-qubit quantum gate execution cost between qubit nodes. Accordingly, the mapped quantum circuit may be operated. Furthermore, according to an embodiment of the present disclosure, a plurality of candidate quantum circuits are mapped by adjusting the mapping between qubit nodes of a quantum chip and qubits of a quantum algorithm, and a quantum circuit having the highest performance is selected. Accordingly, the performance of a quantum circuit becomes uniform.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a computing device, the method comprising:
  obtaining information of a quantum chip including qubit nodes;
  calculating first 2-qubit quantum gate execution costs between qubit nodes of the quantum chip, which are adjacent to each other, based on the information of the quantum chip;
  calculating second 2-qubit quantum gate execution costs between the qubit nodes of the quantum chip based on the first 2-qubit quantum gate execution costs;

mapping qubits of quantum algorithm into the qubit nodes of the quantum chip; and
mapping candidate quantum circuits based on the second 2-qubit quantum gate execution costs,
wherein the mapping of the candidate quantum circuits includes:
generating a first candidate quantum circuit, and
wherein the generating of the first candidate quantum circuit includes:
generating a directed acyclic graph (DAG) of quantum gates of the quantum algorithm;
selecting a front layer of the DAG; and
adding a 1-qubit gate among quantum gates of the front layer to the first candidate quantum circuit.

2. The method of claim 1, wherein the 2-qubit quantum gate execution costs include attenuation of fidelity or a movement time.

3. The method of claim 1, wherein the calculating of the second 2-qubit quantum gate execution costs is based on Floyd-Warshall algorithm.

4. The method of claim 1, wherein the second 2-qubit quantum gate execution costs include moving costs when the qubit nodes respectively moves to other qubit nodes.

5. The method of claim 1, wherein the generating of the first candidate quantum circuit further includes:
removing the 1-qubit gate added to the first candidate quantum circuit from the DAG; and
adding a next quantum gate, which is dependent on the 1-qubit gate, to the front layer.

6. The method of claim 1, wherein the generating of the first candidate quantum circuit further includes:
when qubit nodes corresponding to inputs of a 2-qubit quantum gate of the front layer are adjacent to each other and have a minimum 2-qubit quantum gate execution cost, adding the 2-qubit quantum gate to the first candidate quantum circuit.

7. The method of claim 1, wherein the generating of the first candidate quantum circuit further includes:
when qubit nodes corresponding to inputs of a 2-qubit quantum gate of the front layer are adjacent to each other and do not have a minimum 2-qubit quantum gate execution cost, adding swap candidate gates associated with the qubit nodes corresponding to the inputs of the 2-qubit quantum gate of the front layer.

8. The method of claim 7, wherein the associated swap candidate gates move a qubit of a first qubit node to other qubits adjacent to a second qubit node among the first qubit node and the second qubit node, which correspond to the inputs of the 2-qubit quantum gate of the front layer.

9. The method of claim 7, wherein the generating of the first candidate quantum circuit further includes:
adding the 2-qubit quantum gate of the front layer and a swap gate in which the qubit nodes corresponding to the inputs of the 2-qubit quantum gate of the front layer are adjacent to each other and which has a minimum 2-qubit quantum gate execution cost, from among the associated swap candidate gates to the first candidate quantum circuit.

10. The method of claim 1, wherein the generating of the first candidate quantum circuit further includes:
when qubit nodes corresponding to inputs of a 2-qubit quantum gate of the front layer are not adjacent to each other, adding swap candidate gates associated with the qubit nodes corresponding to the inputs of the 2-qubit quantum gate of the front layer.

11. An operating method of a computing device, the method comprising:
obtaining information of a quantum chip including qubit nodes;
calculating first 2-qubit quantum gate execution costs between qubit nodes of the quantum chip, which are adjacent to each other, based on the information of the quantum chip;
calculating second 2-qubit quantum gate execution costs between the qubit nodes of the quantum chip based on the first 2-qubit quantum gate execution costs;
mapping qubits of quantum algorithm into the qubit nodes of the quantum chip;
mapping candidate quantum circuits based on the second 2-qubit quantum gate execution costs;
measuring performances of the candidate quantum circuits; and
determining a candidate quantum circuit, which has the highest performance, from among the candidate quantum circuits as a quantum circuit.

12. The method of claim 11, wherein the measuring of the performances of the candidate quantum circuits includes:
measuring a performance of a first candidate quantum circuit, and
wherein the measuring of the performance of the first candidate quantum circuit includes:
measuring attenuations of fidelity between inputs and outputs of the first candidate quantum circuit; and
selecting the greatest attenuation of the fidelity as a performance of the first candidate quantum circuit.

13. The method of claim 11, wherein the measuring of the performances of the candidate quantum circuits includes:
measuring a performance of a first candidate quantum circuit, and
wherein the measuring of the performance of the first candidate quantum circuit includes:
measuring passages of time between inputs and outputs of the first candidate quantum circuit; and
selecting the longest passage of the time as a performance of the first candidate quantum circuit.

14. A computing device comprising:
a cost calculation unit configured to calculate 2-qubit quantum gate execution costs between qubit nodes based on information of a quantum chip including the qubit nodes; and
a circuit mapping unit configured to map a quantum circuit based on the 2-qubit quantum gate execution costs and a quantum algorithm,
wherein the 2-qubit quantum gate execution costs include attenuation of fidelity of a movement time when the qubit nodes respectively moves to other qubit nodes, and
wherein the circuit mapping unit is further configured to map qubits of the quantum algorithm into the qubit nodes, map candidate quantum circuits based on one of the 2-qubit quantum gate execution costs; and generate a first candidate quantum circuit by generating a directed acyclic graph (DAG) of quantum gates of the quantum algorithm and selecting a front layer of the DAG, and adding a 1-qubit gate among quantum gates of the front layer to the first candidate quantum circuit.

15. The computing device of claim 14, wherein the circuit mapping unit changes mapping between qubits of the quantum algorithm and the qubit nodes, generates two or more candidate quantum circuits including the first candidate quantum circuit, and determines a candidate quantum circuit, which has the highest performance, from among the two or more candidate quantum circuits as the quantum circuit.

16. The computing device of claim 15, wherein the circuit mapping unit adds swap gates to the candidate quantum circuits as the 1-qubit gate based on the 2-qubit quantum gate execution costs and maps the candidate quantum circuits such that the candidate quantum circuits are capable of being executed in the quantum chip.

\* \* \* \* \*